United States Patent [19]

Potter et al.

[11] 3,881,191

[45] Apr. 29, 1975

[54] THREE-GAP MAGNETIC RECORDING HEAD HAVING A SINGLE FLUX SENSING MEANS

[75] Inventors: Robert I. Potter; Michael W. Warner, both of San Jose, Calif.

[73] Assignee: International Business Machines Corporation, Armonk, N.Y.

[22] Filed: May 19, 1972

[21] Appl. No.: 255,116

[52] U.S. Cl. .............................................. 360/121
[51] Int. Cl. .............................................. G11b 5/27
[58] Field of Search ....... 340/174.1 F; 179/100.2 C; 346/74 MC; 360/121

[56] References Cited

UNITED STATES PATENTS

| | | | |
|---|---|---|---|
| 3,207,856 | 9/1965 | Page | 340/174.1 F |
| 3,317,742 | 5/1967 | Guerth | 340/174.1 F |
| 3,399,393 | 8/1968 | Chang | 340/174.1 F |
| 3,495,049 | 2/1970 | Humphreys et al. | 340/174.1 F |

*Primary Examiner*—Vincent P. Canney

[57] ABSTRACT

A magnetic head is disclosed having an inner magnetic core and an outer magnetic core that is magnetically spaced about the inner core so as to form a three transducer gap structure. A flux sensing means is linked solely with the inner core. The fringing fields under the two outer transducer gaps have the same direction and are of smaller magnitude and in the opposite direction than the fringing field under the central transducer gap. The composite fringing field contributed by this structure results in a narrow pulse width and is useful in high-resolution high-recording density systems.

8 Claims, 10 Drawing Figures

THREE-GAP MAGNETIC RECORDING HEAD HAVING A SINGLE FLUX SENSING MEANS

BACKGROUND OF THE INVENTION

1. Field of the Invention

This invention relates to magnetic transducer heads for providing narrow pulse widths and particularly to such heads having two cores with a single flux sensing means linked solely with the inner core.

In magnetic recording technology it is constantly desired to improve the areal density of information recorded and reproduced from a magnetic medium. Accordingly, the industry is constantly attempting to improve the linear bit recording density, more commonly known as increasing the number of bits per inch. The linear bit density is dependent upon the resolution capability of the magnetic transducer. This invention is directed toward a magnetic transducer having an improved resolution capability and having a single flux sensing means.

2. Description of Prior Art

Recording transducers directed toward the concept of improving the spatial resolution and localizing the spatial extent of an applied magnetic field at the surface of a recording medium are available as evidenced by U.S. Pat. No. 3,064,087 to Gabor which issued Nov. 13, 1962 and as described in IBM Technical Disclosure Bulletins of July, 1963 at p. 68 by Schlaeppi and of Mar. 1970 at p. 1555 by Thompson.

The Gabor patent describes a magnetic transducer apparatus characterized by a longitudinal component of the magnetic field intensity function with a negative undershoot. However, this apparatus would be inapplicable on accessing systems since it requires, in addition to a first magnetic transducer, a second magnetic core member on the other side of a magnetic medium and spaced under the air gap of the first transducer. To access this transducer system would require synchronized actuating means on both sides of the recording medium, which is beyond the present state of the art in high density magnetic recording systems.

The Schlaeppi publication describes a magnetic recording head for obtaining a pulse-sharpening effect which comprises an inner core and an outer core that are magnetically connected along their respective back legs and which utilizes three separate coils for energization. By a proper division of the coil windings between the three legs, resolution is improved.

The Thompson publication describes a three-conductor three-gap magnetic transducer, similar to the one described by Schlaeppi, but limits his description to a thin magnetic film structure. The use of three separate conductors requires individual electronic amplifying circuits for each of the individual conductors to accomplish the required pulse-sharpening effect. Moreover, the thin film head described by Thompson is virtually impractical to achieve since it does not lend itself to thin film manufacture.

In order to overcome the above noted defects, a novel head has been devised wherein two magnetic cores are magnetically shaped from one aother so as to define three transducer gaps. A single flux sensing means is linked soley with the first central core to simply control the negative field outside the central gap such that the narrowest possible readback pulse is obtained while avoiding objectionable undershoot in the readback pulse. This transducer lends itself to thin film fabrication since only seven thin film layers are necessary and can be employed for writing as well as reading information from a magnetic medium.

Accordingly, it is an object of this invention to provide a simple, small magnetic recording transducer that is capable of recording and reproducing information from magnetic tapes, disks or other magnetic mediums.

It is another object to provide a magnetic head assembly for use in magnetic record/reproduce systems comprising a first central magnetic core means defining a first transducer gap, a second outer magnetic core means magnetically spaced about the first magnetic core means with regions between the second core means and the first core means defining a second outer transducer gap and a third outer transducer gap, flux sensing means linked solely with the first central core means, the first central core means and the second outer core means each contributing to the composite fringing field of the magnetic head assembly such that the fringing field under the second transducer gap and the third transducer gap have the same direction and are of smaller magnitude and in the opposite direction than the fringing field under the first transducer gap, the composite fringing field resulting in a narrow readback voltage pulse.

In accordance with the above object it is another object to provide a core assembly characterized by a sensitivity function such that the magnetic field across the second and the third outer transducer gaps is of a lesser magnitude and in the opposite direction than the magnetic field produced by the first transducer gap.

In accordance with the above objects, it is still another object to provide a magnetic head assembly wherein the reluctance of the magnetic cores are different, and wherein the three transducer gaps are substantially the same length and wherein the pole tips of the cores are substantially coplanar.

It is yet another object to provide a multigap magnetic head assembly fabricated from thin films and comprising a non-magnetic substrate; and magnetic, nonmagnetic insulating and conductive layers selectively deposited thereover such that energization of the conductive layer produces a narrow composite magnetic field beneath the pole tips, the wings of the field exhibiting a controllable degree of undershoot.

The foregoing and other objects, features and advantages of the invention will be apparent from the following more particular description of the preferred embodiment of the invention as illustrated in the accompanying drawings.

DESCRIPTION OF THE INVENTION

Figures 1, 2:
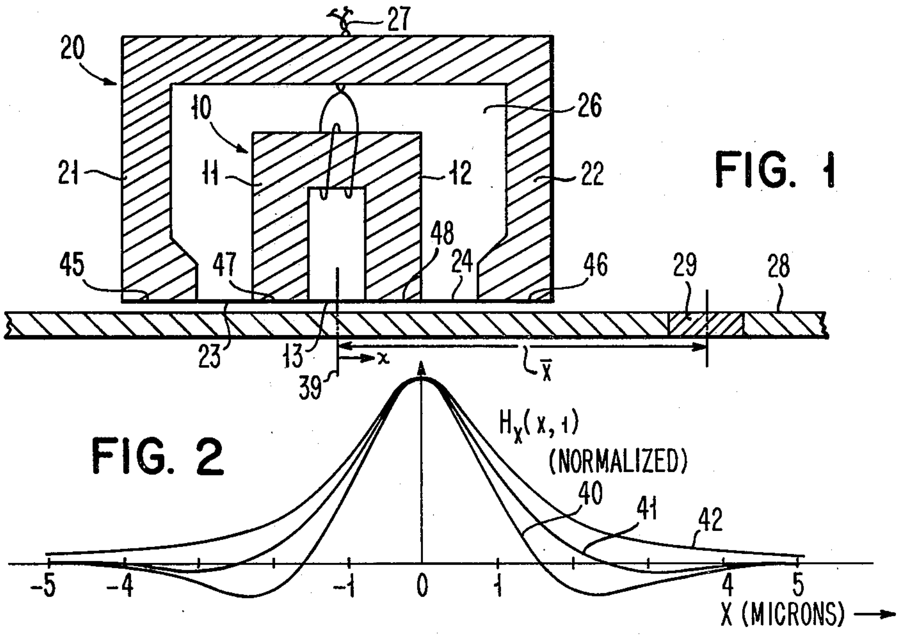
FIG. 1 is a side elevation view of the magnetic transducer of the invention.
FIG. 2 is a graph of the sensitivity function of three types of magnetic heads.

The magnetic transducer assembly shown in FIG. 1 comprises a first inner central magnetic core 10 having first leg portion 11 and second leg portion 12 terminating in pole tips 47 and 48, respectively so as to define a first transducer gap 13. A second outer magnetic core 20 is spaced about the first core 10 and has leg portions 21 and 22 terminating in respective pole tips 45 and 46. The regions between the second core and the first core define a second transducer gap 23 and a third transducer gap 24. The pole tips 45, 46, 47 and 48 of this assembly are substantially coplanar. A single flux sensing means 27 which is particularly shown to be a coil is wound around the back portion of the first magnetic core 10. The cores are maintained magnetically apart by physically positioning an insulator 26 such as glass therebetween. For magnetic purposes the two cores are nearest each other in the pole tip and gap region. Thus, magnetic flux will flow serially through the cores, and coupling will occur in the gap region where the magnetic reluctance is lowest. In operation the assembly is positioned over a moving magnetic medium 28 which may be a disk, tape or the like for the purpose of recording or reading information thereon.

Figure 4A:
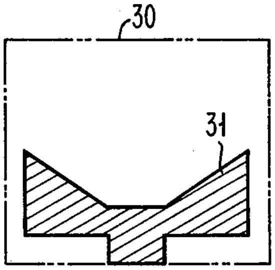
FIGS. 4A through G are front elevational views of the preferred embodiment of the magnetic transducer assembly of the present invention illustrating the successive steps necessary to fabricate the assembly.
Figure 4B:
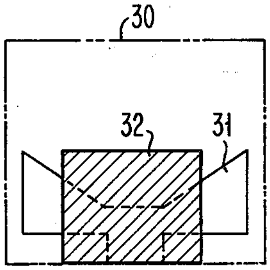
Figure 4C:
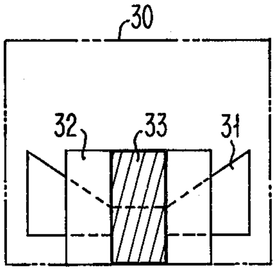
Figure 4D:
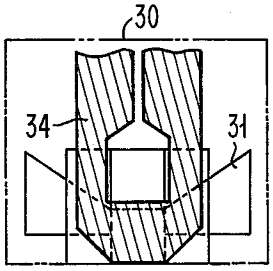
Figure 4E:
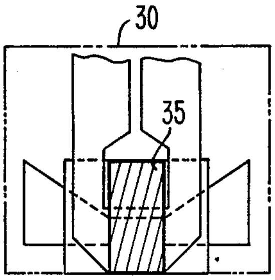
Figure 4F:
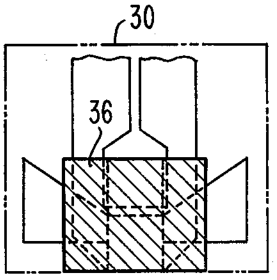
Figure 4G:
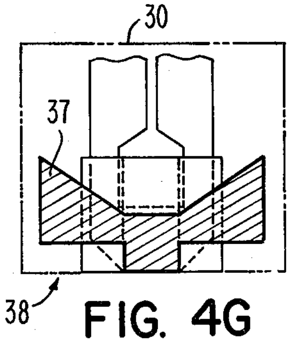

FIGS. 4A through G illustrate one manner in which the magnetic head assembly of FIG. 1 is fabricated as a multilayer thin film structure using conventional vapor deposition, sputtering and electroplating techniques. The cross-hatching indicates the last layer to be fabricated. On a suitable planar substrate 30 of oxidized silicone, glass, $SiO_2$, barium titanate or the like, is plated a first magnetic film 31 which may particularly be permalloy or nickel zinc ferrite as shown in FIG. 4A. Alternatively, the magnetic films described in this application can be evaporated or sputtered as desired. The magnetic film 31 is butterfly-shaped having extending wing portions that are wider than the neck portion. As shown in FIG. 4B a first nonmagnetic layer 32 is selectively deposited such as by sputtering over all portions of the magnetic layer 31 except for the outwardly extending wings. The nonmagnetic layer may particularly be $SiO_2$. A second magnetic film layer 33 is deposited within the side boundaries and over the insulating layer 32 so that it does not contact the first magnetic layer 31 as illustrated in FIG. 4C. The second layer 33 is rectangularly shaped and is of the same height as the insulating layer 32 and width of the neck portion of layer 31. FIG. 4D shows the deposited electrically conducting layer 34 which may desirably be copper. This layer has tapered portions near the base surface of the substrate and a window portion with a lower ledge above the top surface of the first magnetic layer 31. The conductor extends upwardly to terminals above the other portions of the magnetic head assembly. As shown in FIG. 4E a third magnetic film layer 35 is plated onto the conductor 34, similar in shape to the second magnetic film layer 33. Layers 35 and 33 contact each other within the window opening of the conductor so as to form a first inner magnetic yoke of this magnetic head assembly. Thereafter, as illustrated in FIG. 4F, a second rectangular nonmagnetic layer 36 is sputtered over and beyond the side extremities of magnetic layer 35, similar to the nonmagnetic layer 32. Finally, a fourth magnetic film layer 37 is deposited over nonmagnetic layer 36 in a butterfly pattern. Layer 37 physically and magnetically contacts layer 31 in the outer wing extremities so as to form a continuous magnetic path therebetween and to create a second outer magnetic core means that is magnetically spaced from the inner magnetic core formed by magnetic layers 33 and 35. After the deposition process is completed, the entire assembly is lapped along the face surface 38 to form coplanar pole tips on the several magnetic layers and the magnetic head is cut from the substrate 30. The magnetic head is complete except for the electrical contacts and leads that will be assembled to the extending terminals of conductor 34. Although the fabrication of only one head has been described, in practice the heads are batch fabricated with hundreds being formed simultaneously on each substrate.

It should be noted that the reluctance of the outer magnetic core could be increased by placing a nonmagnetic layer in the back gaps, thus spacing portions of the magnetic layers 31 and 37 from each other. The effect of increasing the reluctance of this magnetic circuit changes the magnetic fringe field under the three gaps and will be discussed later in this specification. In addition, a magnetoresistive layer (not shown) together with appropriate electrical conductors could be utilized as the flux sensing means.

FIG. 2 is a graph that illustrates the longitudinal or track direction component of the magnetic fringe field as a function of the longitudinal distance, $x$, from the center 39 of the gap of several different magnetic heads. This component of the fringe field is known as the sensitivity function and is useful when discussing the readback characteristics of magnetic heads via the well-known electromagnetic principle known as "reciprocity." The curves shown are normalized. Curve 40 shows the longitudinal component of the fringe field for a three-gap magnetic head as illustrated in FIG. 1 having the ratio of magnetic fields across the outer pole tips to that across the inner pole tips ($h_g/H_g$) equal to $-1/3$. This field is computed by assuming the magnetic scalar potential varies linearly across each gap and that the length of the two pole tips of the inner core are equal to one micron as are all three gaps. The pole-tip lengths of the outer core are assumed to be much greater than the pole tips lengths of the inner core. This fringe field is seen to become negative between one and two microns. Curve 41 is the fringe field of a vertical two pole magnetic film head such as described in U.S. Pat. No. 3,344,237, issued to Gregg. The sensitivity function of the vertical film head also becomes negative but is of a lesser magnitude than that of the three-gap head. This field is computed via conformal mapping techniques. For comparison purposes curve 42 shows the sensitivity function of a semi-infinite magnetic head having one gap where the pole faces are large compared to the gap length. This field is computed by assuming the magnetic scalar potential varies linearly across the gap (Karlquist's approximation). This field never becomes negative and is much wider than curves 40 and 41.

Figure 3:
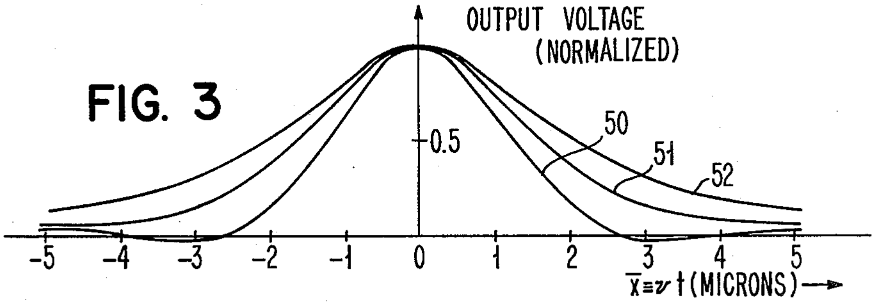
FIG. 3 is a graph of the normalized readback voltage received at the output of the three magnetic heads of FIG. 2.

The graph of the readback pulses corresponding to the described sensitivity functions of the three magnetic heads are shown in FIG. 3. Curve 50 corresponds to the three-gap head; curve 51 to the vertical film head; and curve 52 to the semi-infinite head. These pulses are calculated from an arctangent approximation to the magnetization transition or bit 29 located within recording medium 28. In this example, the transition length, $\pi a$, of bit 29, is $\pi/2$ microns, the recording medium thickness is one micron, and the head-to-medium separation is one micron. The output voltage is plotted versus distance $\bar{x} \equiv vt$ between the center of the head and the center of the recorded bit 29, where $v$ is the relative velocity between the head and the medium and $t$ is the time.

A comparison of the readback curves indicates that both the vertical film head and the three-gap head have more narrow pulses than the semi-infinite head. It is also observed that the most narrow pulse results from the three-gap head assembly characterized by a fringe field having a region in which the longitudinal component exhibits negative values.

It will be recalled that the readback performance of a magnetic recording head is characterized by the magnetic fringe field that exists when the flux sensing means is energized with unit current. The spatial variation of this field depends on the ratio $h_g/H_g$. Control of this ratio by uniquely using a single flux sensing (or flux generating) means is now considered.

Referring to FIG. 1, in the absence of current through flux sensing means 27, all four pole tips 45, 46, 47 and 48 will be at the same magnetic potential. To simplify the ensuing analysis this potential is considered to be zero. The presence of current will cause equal and opposite magnetic potentials on pole tips 47 and 48. Since the flux sensing means is linked solely with the first central core, outer core pole tips 45 and 46 are at substantially zero magnetic potential as long as the reluctance of the outer core is negligible compared to the reluctance of the outer gaps 23 and 24. In this case the potential difference across the outer gaps 23 and 24 is $-\Delta\Phi/2$ where $\Delta\Phi$ is the potential difference across center gap 13. Thus for three equal gap lengths $h_g/H_g = -½$. It is this novel approach of magnetically decoupling the inner and the outer cores, except at the gap regions, which allows the single-coil three-gap head to produce the narrow readback pulse and achieve high resolution. It has been found that the magnetic field ratio should be between −¼ and −½ to produce the narrowest possible readback pulse which does not exhibit an objectionable undershoot. The optimal value of this ratio is chosen in cognizance of parameters characterizing the total recording system; including head-to-medium separation, medium thickness and transition length. For the three-gap head having the parameters used to generate curves 40 and 50 the optimal field ratio is approximately −⅓. In all these discussions it is noted that the direction of the fringe field under the outer gaps is in the opposite direction than the fringing field under the central gap.

The field ratio of this novel three-gap head can be continuously varied from −½ to approxmately 0 by varying the reluctance of the outer core. As previously mentioned the reluctance can be increased by inserting a nonmagnetic back-gap into the outer magnetic core or by reducing the cross-sectional area of the outer core. Moreover, it will be appreciated that outer gaps 23 and 24 do not necessarily have to be equal to central gap 13.

From the foregoing, it will be understood that the invention provides a novel and simple magnetic recording head for slimming and controlling the undershoot of the composite longitudinal component of the magnetic fringing field and as a consequence the readback pulse of the magnetic head assembly. This head requires only one flux sensing means that is associated or wound solely around the inner magnetic core. This high resolution record/reproducing head is capable of recording and reading at higher longitudinal densities thus allowing more information to be stored on a magnetic medium. Although a single-turn thin film magnetic head has been described it is noted that single-coil multiturn heads or magnetoresistive heads having a magnetoresistive element disposed within the center gap 13 could be also fabricated by adding additional insulation and conducting layers to the inner core.

While there has been described what are, at present, considered to be the preferred embodiments of the invention, it will be understood that various modifications may be made therein, and it is intended to cover in the appended claims all such modifications as fall wtihin the true spirit and scope of the invention.

What is claimed is:

1. A multigap magnetic head assembly for use in magnetic record/reproduce systems comprising:

a first inner magnetic core having first and second leg portions defining a first transducer gap therebetween;

a second outer magnetic core having a third and fourth leg portions, said first core maintained spaced apart from said second core, said first and third leg portions defining a second transducer gap therebetween and said second and fourth leg portions defining a third transducer gap therebetween wherein said first and said second and said third transducer gaps are substantially the same length;

a single flux sensing means linked with said first core means;

said core assembly characterized by a sensitivity function such that the magnetic field across the second and third outer transducer gaps is of a lesser magnitude and in the opposite direction than the magnetic field produced by the first transducer gap.

2. The magnetic head assembly as set forth in claim 1 wherein said second outer magnetic core has a different reluctance than the reluctance of said first magnetic core.

3. The magnetic head assembly set forth in claim 1 wherein said second core has a smaller cross-sectional area than said first inner magnetic core.

4. The magnetic head assembly set forth in claim 1, wherein the pole tips of said first magnetic core and said second magnetic core are coplanar.

5. The magnetic head as set forth in claim 2, wherein said single flux sensing means comprises a coil.

6. The magnetic head as set forth in claim 2 wherein said transducer gaps have a gap length such that the ratio of magnetic fields across said second magnetic core to that of said first magnetic core is between −¼ and −½.

7. A multigap magnetic head assembly for use in magnetic record/reproduce systems comprising:

a nonmagnetic substrate;

a first magnetic layer selectively deposited on said substrate;

a first nonmagnetic layer selectively deposited on said first magnetic layer;

a second magnetic layer selectively deposited on said first nonmagnetic layer;

a first conductive layer selectively deposited on said second magnetic layer and said substrate so as to form a coil;

a third magnetic layer selectively deposited over said conductor layer and against the second magnetic layer, said second and third magnetic layers comprising an inner magnetic core, said conductive layer disposed between said second and said third magnetic layers;

a second nonmagnetic layer selectively deposited over said third magnetic layer; and a fourth magnetic layer deposited over said second nonmagnetic layer, said end portion of each of said first and said second and said third and said fourth magnetic layers disposed in a common plane perpendicular to the plane of said substrate and defining a respective pole tip of said magnetic head; and means for energizing said conductive layer whereby said energization produces a composite magnetic fringing field beneath said pole tips;

wherein the composite magnetic field produced is characterized by a sensitivity function such that a first portion of the magnetic field produced between said first and second magnetic layers is substantially equal to a second portion of the magnetic field between said third and said fourth magnetic layers, said first portion and said second portion of said magnetic field having a smaller magnitude and being in the opposite direction than a third portion of the magnetic field produced between said third and said second magnetic layers.

8. The magnetic head assembly as set forth in claim 7, wherein the gap lengths between adjacent pole tips in said common plane are substantially equal.

* * * * *